May 21, 1957  G. W. KENYON  2,792,650
POWER OPERATED LATCH AND ANGLING MECHANISM
Filed Nov. 16, 1955  6 Sheets-Sheet 6

INVENTOR.
GEORGE W. KENYON
BY
ATTORNEY

United States Patent Office 2,792,650
Patented May 21, 1957

2,792,650

POWER OPERATED LATCH AND ANGLING MECHANISM

George W. Kenyon, Clayton, N. Y., assignor to Frink Sno-Plows, Inc., Clayton, N. Y., a corporation of New York Application November 16, 1955, Serial No. 547,132

7 Claims. (Cl. 37—42)

This invention relates to blade and moldboard adjusting mechanism for snow plows and the like. In a more particular aspect the invention relates to power mechanism for adjusting the transverse position of a scraper blade and moldboard, such as employed on snow plows and similar material handling equipment.

It is an object of this invention to provide a single control which is effective to unlatch and angle the blade and moldboard of a snow plow or the like, and which provides for the automatic reengagement of the blade and moldboard latch after an adjustment of the blade and moldboard has been made.

It is a further object of the invention to provide for the power adjustment of a snow plow blade and moldboard into any one of a plurality of angular positions to either side of the normal operating direction of the equipment, wherein the blade and moldboard is automatically unlatched prior to the adjusting operation and then automatically latched in its position of adjustment.

It is a further object of the invention to provide fluid pressure means for adjusting the transverse position of a snow plow blade and moldboard which is effective to first unlatch the blade and moldboard, then adjust the blade and moldboard to a selected position, and thereafter latch the blade and moldboard in such selected position.

In connection with the foregoing objective it is a further purpose hereof to provide in such fluid pressure operated device, a blade and moldboard latch which in and of itself is effective to retain the position of angular adjustment of the blade and moldboard without continued application of pressure in the find pressure system.

It is an overriding object of the invention to provide a power operated blade and moldboard latch which avoids the necessity for manual manipulation of latching devices but which permits complete control of the blade and moldboard including unlatching, adjustment and relatching from a remote point, such as from the cab of a vehicle from which the blade and moldboard is supported.

These and other objectives and advantages of the invention will become apparent as the description of an illustrative embodiment thereof proceeds, in the light of the drawings forming a part of this application, and in which drawings

The invention provides for a main supporting frame which is adapted for attachment to a propelling vehicle as by attaching the same to the front end of a motor truck. The main supporting frame is adapted to support in operative position an adjustable semi-circular frame on which a moldboard drive frame is mounted for limited vertical and angular movement. A snow plow mechanism of these general characteristics is shown in my application for patent, Serial No. 243,971, filed August 28, 1951, for Reversible Trip Blade Snow Plow.

Figure 1:
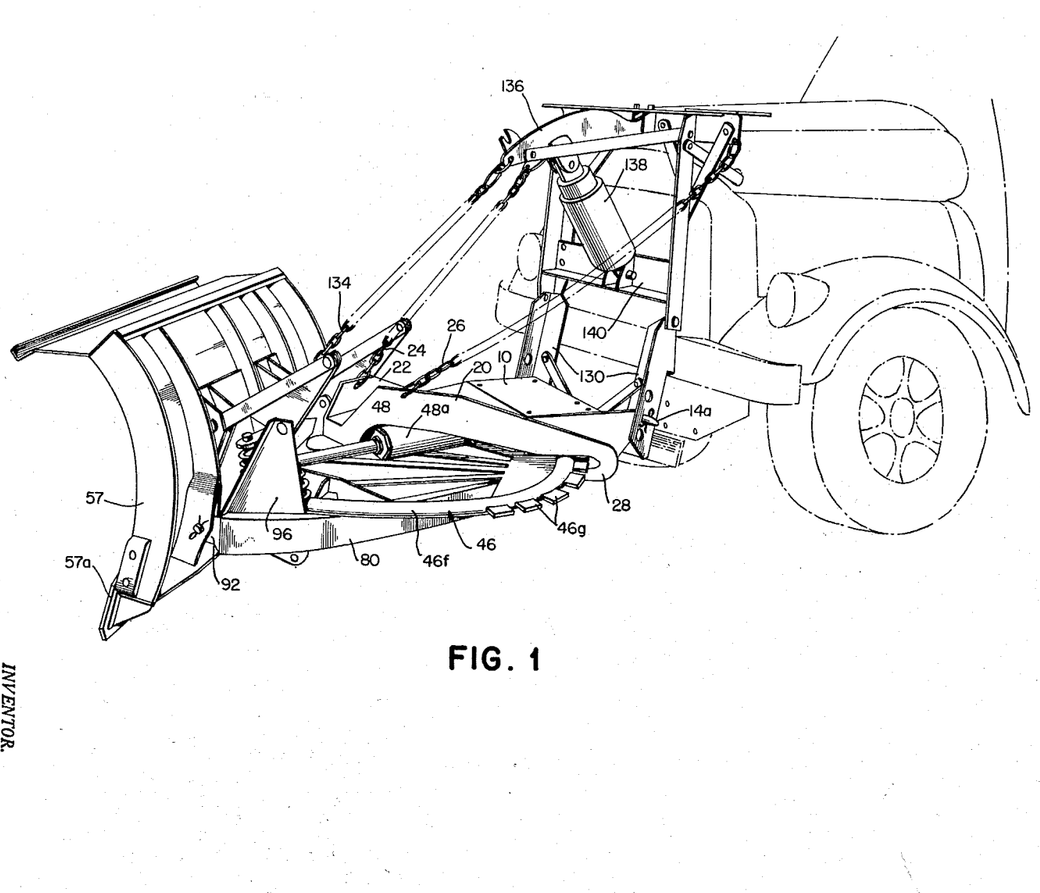
Fig. 1 is a perspective view of a snow plow in which the invention is embodied, the snow plow mechanism being supported from the front end of a vehicle which is shown in dot-dash lines.

This invention is an improvement on the structure shown in my aforesaid application in that herein is provided means for adjusting the transverse angle of the snow plow blade and moldboard by means of a fluid pressure system, which system is also effective to control the latching and unlatching of the frame which supports the blade and moldboard. A supporting frame 10 (Fig. 1), sometimes known as an A frame, is provided for direct attachment to a propelling vehicle such as a motor truck. The supporting frame includes a base member 12 (Fig. 2), from which project a pair of ears 14 and 16 which are apertured to receive pins 14a and 16a (Figs. 1 and 3), for example, by means of which the supporting frame may be attached to the push frame of a truck, for example. Attached to and extending forwardly from the supporting frame base member 12 is a rib 18, and at the side of the structure are a pair of flanges 20 and 22 (Fig. 2), which, at their forward, upstanding portions, have attached thereto supporting chains 24 and 26 (Fig. 1). The rear ends of the flanges 20 and 22 are shaped to form hooks, such as the hook 28 shown in Fig. 1 of the drawings. The eye of the hook-shaped ends of the flanges 20 and 22 are slightly wedge-shaped for a purpose that will be pointed out later. These hooked portions of the flanges 20 and 22 are adapted to accommodate the rim of a semi-circular frame which is to be described directly.

Figures 3, 5:
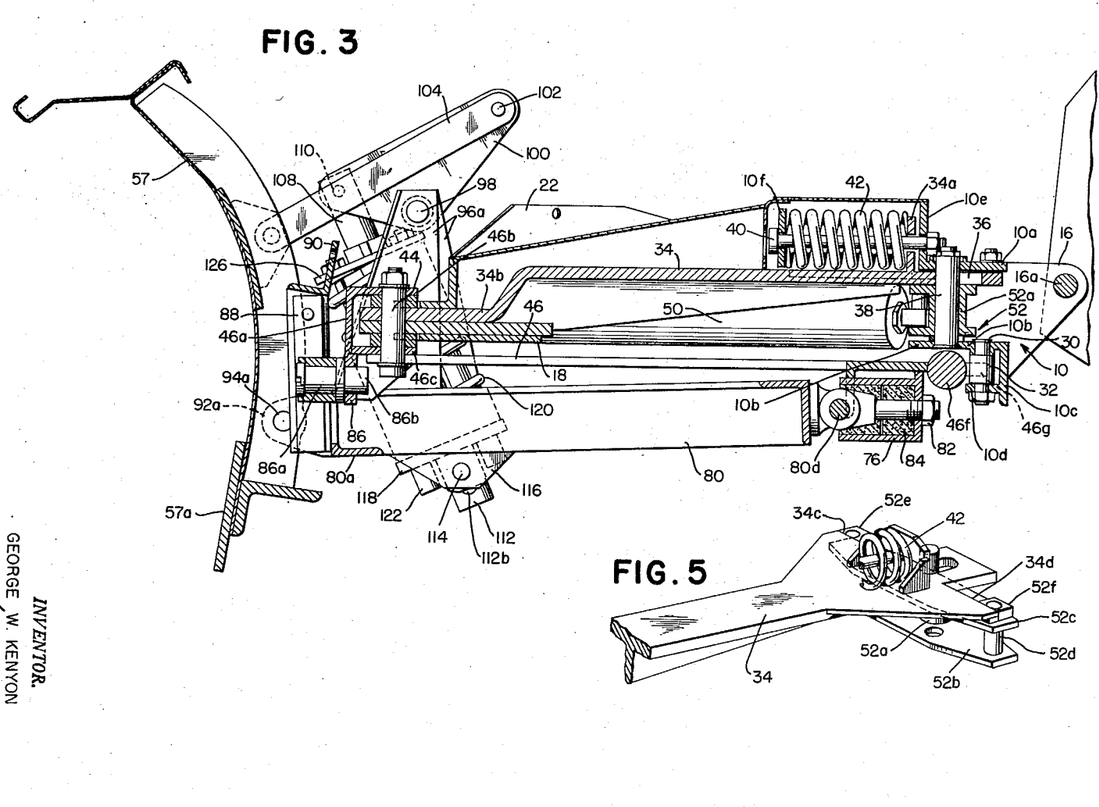
Fig. 3 is a sectional view on line 3—3 of Fig. 2.
Fig. 5 is a fragmentary perspective view of a thrust bar and associated mechanism comprising part of a blade and moldboard latching system.

By reference to Fig. 3 it may be seen that the supporting frame 10 is so formed at the base thereof as to provide a pair of spaced walls 10a and 10b having passages therein which are vertically aligned for receiving a pivot pin. The wall 10b has a downwardly extending flange 10c which is formed with a forwardly extending flange 10d substantially perpendicular to the face of the flange 10c. The wall 10b and the flange 10d have formed therein registering passages for the accommodation of a latch pin 30 on which may be supported a latch roller 32.

The upper wall 10a on the supporting frame 10 has an upwardly extending flange 10e. The upstanding flange 10e is apertured for receiving the bolt of a return spring device to be described at a later point herein.

Overlying the rib 18 of the supporting frame 10 is a thrust bar 34 which at its forward end provides a support for the semi-circular frame heretofore mentioned, and which at its rear end is operatively coupled with the supporting frame 10. Accordingly, the rear end of the thrust bar 34 has an elongated eye 36 therein. This eye is adapted to embrace a pivot pin 38 with sufficient freedom to permit the thrust bar a limited degree of reciprocating motion in a forward and rearward direction. The thrust bar 34 has an apertured flange 34a extending upwardly therefrom in such position as to lie in a plane parallel to but somewhat spaced from the upstanding flange 10e of the supporting frame. The aperture in the flange 34a of the thrust bar is in alignment with that in the flange 10e of the supporting frame, so that a bolt 40 can pass through the two flanges. A return spring 42 of the compression type is located between the outer face of the thrust bar flange 34a and the inner face of a thrust washer 10f, the loading of the spring being transmitted through spring bolt 40 to the upstanding flange 10e of the supporting frame such that the thrust bar is normally maintained at the limit of its rearward movement wherein the forward end of the elongated eye 36 thereof is in contact with the forwardly disposed peripheral surface of the pivot pin 38. This is the relative position of the parts shown in Fig. 3 of the drawings, and it is that position in which the parts are disposed under normal operative conditions.

Figure 2:
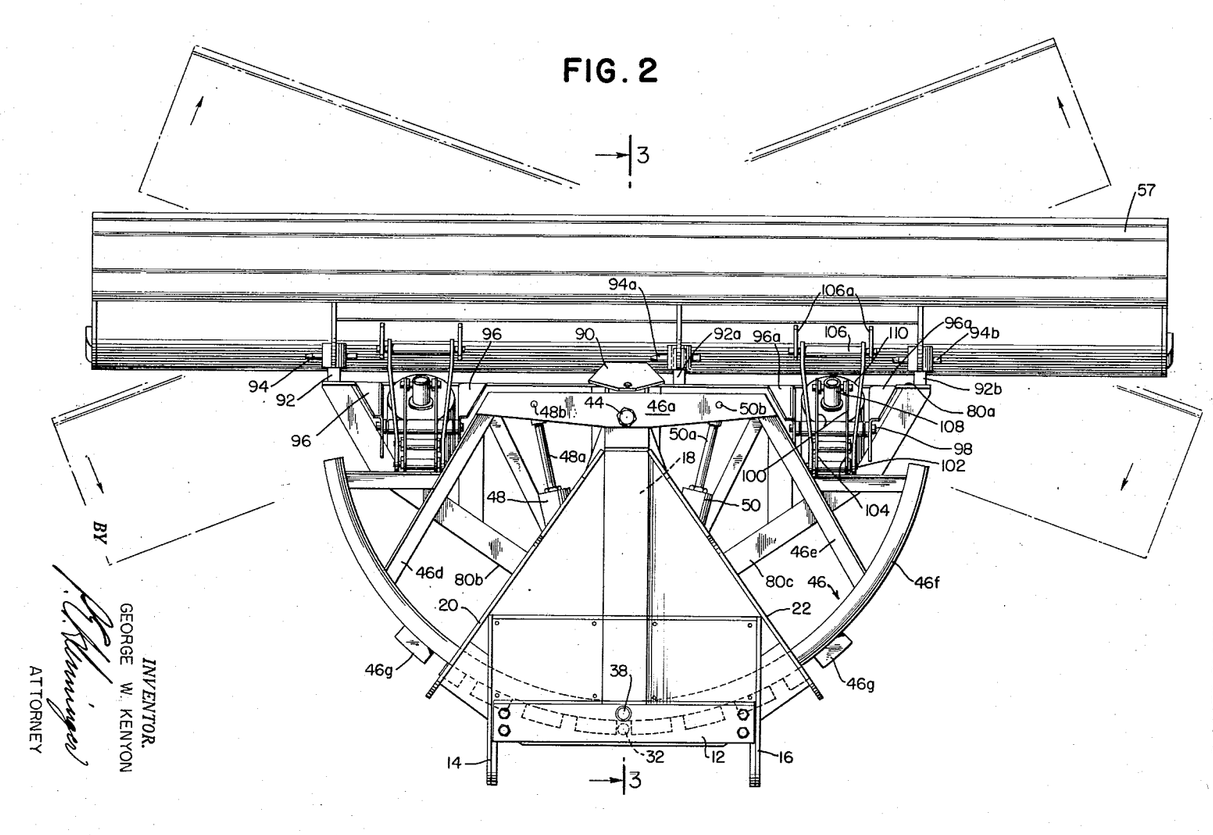
Fig. 2 is a plan view of the snow plow mechanism wherein two different angular positions of blade and moldboard adjustment are indicated by the broken lines.

The forward reinforced end of the thrust bar 34b is apertured to receive a pivot pin 44. The pivot pin 44 is adapted to maintain the operative relationship between the thrust bar 34 and a semi-circular frame 46. The semi-circular frame has a laterally extending, forwardly disposed base member 46a which provides a pair of walls 46b and 46c, which are disposed in spaced, horizontal planes and which are apertured to provide a socket for the pivot pin 44. It is by this means that the semi-circular frame 46 is mounted on the forward end of the thrust bar 34. Extending rearwardly from the base member 46a of the semicircular frame, as best seen in Fig. 2, are a pair of braces 46d and 46e upon the outer ends of which is mounted a semi-circular rim 46f which has been heretofore referred to as the structure with which the hook shaped ends 28 of the flanges 20 and 22 of the supporting frame cooperate. The semi-circular rim 46f may be tubular or solid, as the strength of the device may require.

Extending outwardly in a radial direction from the semi-circular rim 46f are a plurality of spaced latch teeth 46g. The teeth 46g are spaced from each other a sufficient distance to accommodate therebetween in substantially close relation the latch roller 32, whereby the teeth 46g and the latch roller 32 constitute a latch device between the semi-circular frame 46 and the supporting frame 10.

The function of the spring 42 can now be understood. The semi-circular rim 46f and its latch teeth 46g are so positioned in respect to the latch roller 32 that when the spring 42 urges the thrust bar 34 into its rearmost position, as shown in Fig. 3, the latch roller 32 will be engaged between a pair of adjacent latch teeth 46g and the semi-circular frame 46 will be latched to the supporting frame 10, thereby holding the semi-circular frame 46 from swinging about its pivot 44 by which it is operatively connected to the forward end of the thrust bar 34.

At the same time it can be seen that if the thrust bar 34 is moved forwardly against the tension of the spring 42, so that the rear end of the elongated eye 36 in the thrust bar is in contact with the rear surface of the pivot pin 38, the entire semi-circular frame 46 will be moved forward sufficiently to separate the latch teeth 46g from the latch roller 32. When the latch teeth 46g are free of the latch roller 36, the semi-circular frame 46 can be rotated about the pivot pin 44, thereby adjusting its angular position. The strength of the spring 42 is such that considerable force is required to compress it to such an extent as to separate the latch teeth 46g from the latch roller 32, and consequently it is of such strength that when a force tending to compress the same is released, the thrust bar 34 and the semi-circular frame 46 are both carried rearwardly by the spring 42, so that the latch teeth 46g and the latch roller 32 are again engaged in any angular position into which the semi-circular frame 46 may have been adjusted. When the frame 46 is in the forward or unlatched position, the semi-circular rim 46f has some freedom in the eyes of the hook shaped ends of the flanges 20 and 22, but in the latched position of the frame 46, the eyes in the ends of the flanges 20 and 22 will in effect bind the rim 46f by reason of the wedge shape of the eyes. This provides two additional stable supporting points for the frame 46.

The essence of the invention is the provision of a hydraulic system including a pair of hydraulic rams adapted not only to disengage the latch teeth 46g from the latch roller 32, but also to angularly rotate the semi-circular frame 46 about the pivot pin 44 to effect the angular adjustment of the semi-circular frame 46 with reference to the direction of movement of the supporting vehicle. Such angular adjustment is significant in that it will be shown hereinafter that the snow plow blade and moldboard of necessity follow the adjustment of the semi-circular frame 46.

The fluid pressure system for adjusting the semi-circular frame 46 angularly about its pivot pin 44 includes a pair of double acting rams 48 and 50 (Fig. 2), having pistons 48a and 50a, respectively. The forward end of the pistons 48a and 50a are secured on journal pins 48b and 50b which are fixed to the semi-circular frame base 46a at points laterally spaced and equi-distant from the pivot pin 44. The rear ends of the rams 48 and 50 are pivoted respectively to the opposite ends of a shift lever 52 which can be seen in cross-section in Fig. 3 of the drawings, and in further detail in Fig. 5 of the drawings. The shift lever 52 has a central hub 52a which embraces the pivot pin 38, so that the shift lever 52 may rock about the pivot pin 38. The lever 52 is composed of a pair of elongated plates 52b and 52c. These plates are held in a fixed spaced face-to-face relationship by means of the central hub 52a and spacing studs 52d at the opposite ends of the lever. The spacing studs 52d each comprises a terminus for the rear end of the cylinders 48 and 50 to which they are attached.

As shown in Fig. 5 of the drawings the thrust bar 34 has a generally T-shaped rear end providing a pair of flanges 34c and 34d, which comprise abutments for a pair of blocks 52e and 52f, which are held on the upwardly extending ends of the spacing studs 52d, such that the blocks 52e and 52f may rotate on the studs.

It may now be seen that since the pistons 48a and 50a (Fig. 2) are attached to the base 46a of the semi-circular frame 46, any relative elongation or shortening of one ram structure in respect to the other will result in the angular movement of the shift lever 52 (Fig. 3) about its pivot 38. Force is thereby transmitted from the shift lever 52 through either of the blocks 52e or 52f (Fig. 5) to force the thrust bar 34 forward against the resistance of the return spring 42. Such movement will continue until the rear end of the elongated eye 36 in the thrust bar abuts the rear face of the pivot pin 38. At this point the latch teeth 46g are disengaged from the latch roller 32 and the semi-circular frame 46, is, therefore, free to pivot about its pivot pin 44. Further differential operation of the rams 48 and 50 will swing the semi-circular frame 46 about its pivot pin 44. The fluid pressure system is, therefore, continued in operation under control of the operator through manipulation of a control valve until the desired angular position of the semi-circular frame 46 has been attained, whereupon pressure in the system is released to permit the return spring 42 to move the thrust bar 34 rearwardly once again and thereby engage the latch roller 32 between two of the latch teeth 46g at the new position of adjustment.

Figure 6:
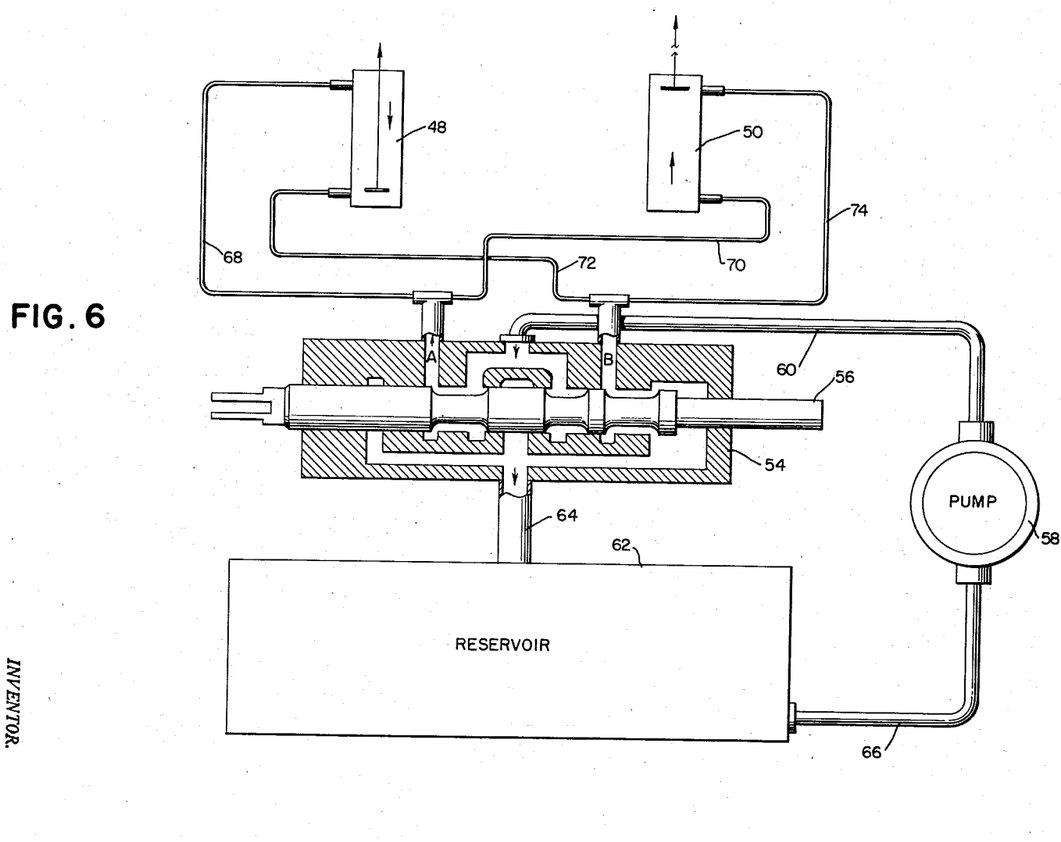
Fig. 6 is a more or less diagrammatic illustration of a fluid pressure system for adjusting the blade and moldboard, the figure showing a hydraulic control valve, partly in section and partly in full line, by which the system may be controlled.

Figs. 6, 8a, 8b and 8c illustrate a fluid pressure control system suitable for control of the mechanism herein. Since no novelty is claimed in this system, the description thereof need be sufficient only to indicate its general nature. In Fig. 6 the rams 48 and 50 are connected to a control valve 54 which has a control stem 56 therein adapted to control the flow of a fluid through the respective ports of the valve. The inlet port of the valve is connected to a pump 58 by means of a tube 60. The outlet port of the valve is connected to a reservoir 62 by means of a tube 64. The reservoir 62 is connected to the pump 58 by means of a tube 66. The valve has a pair of ports A and B, each respectively connected to opposite sides of the piston in the fluid pressure cylinders 48 and 50. Thus, the port A is connected by means of a tube 68 to the front end of the ram 48 and by means of a tube 70 to the rear end of the ram 50. The port B is connected by means of a tube 72 to the rear end of the ram 48 and by means of a tube 74 to the front end of the ram 50. This constitutes the fluid pressure system a double acting ram system.

With the valve stem 56 in the position illustrated in Fig. 6, the pump 58, drawing fluid from the reservoir 62 will force this fluid through the inlet port of the valve and past the now open internal ports to the port A which will result in the input of fluid to the outer end of the ram 48 and to the inner end of the ram 50. At the same time fluid in the respectively opposite ends of the rams 48 and 50 is returned through the valve port B and through the now open inner ports to the return tube 64 and the reservoir 62.

Figure 8A:
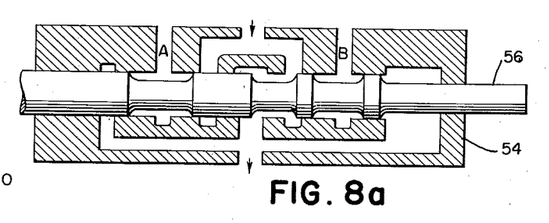
Figs. 8a, 8b and 8c are sectional views through the fluid pressure control valve showing the relative positions of the valve ports and reciprocating valve stem for producing three different states in the fluid pressure system.

In Fig. 8a the valve stem 56 is positioned with respect to the ports in the valve body such that the fluid flow from the pump is directly through the valve and back to the reservoir, both ports to the rams being blocked by the valve stem, but the ports between the inlet from the pump and the outlet to the reservoir being open.

Figure 8B:
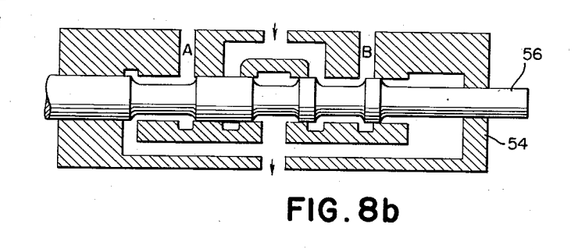
Figure 8C:
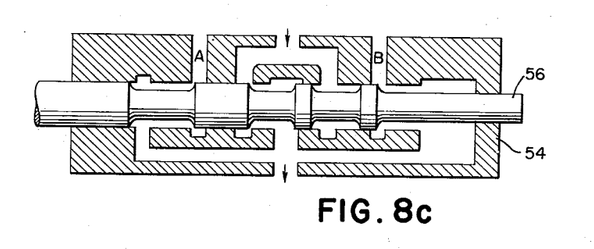

Fig. 8b is that relative position of the valve stem 56 to the internal ports of the valve which results in fluid pressure at port B and return to port A. Fig. 8c illustrates the relative position of the valve stem 56 to the internal ports of the valve which connect the inlet from the pump directly to the valve outlet and also each of the ports A and B to the outlet.

It will be shown with further reference to Figs. 2 and 3 how a moldboard 57 and its attached snow plow blade 57a is supported to move jointly with the semi-circular frame 46. The semi-circular frame 46 has attached thereto and extending from the lower face thereof a socket 76 which is adapted to support one end of a drive frame 80. The drive frame 80 is a generally triangular shaped frame which has a transverse base member 80a at the front thereof and a pair of rearwardly converging brace members 80b and 80c (Fig. 2), which join at an apex from which extends a universal joint connection 80d (Fig. 3). One end of the universal joint connection is maintained in the socket 76 by means of a bolt 82 which extends through the rear wall of the socket 76 and the nut of which bears against the outer face of the rear wall of the socket 76. Interposed between the universal joint and the inner face of the rear wall of the socket 76 is a resilient bumper 84. By means of the universal joint 80d the drive frame 80 is permitted to rotate about the axis of the socket 76 and rise and fall in respect to the semi-circular frame 46, thus providing a satisfactory base on which the moldboard or blade may be mounted.

It has been stated hereinbefore that the semi-circular frame 46 is in effect the control element for the positioning of the moldboard and blade. This is by reason of the fact that provision has been made for the conjoint movement of the semi-circular frame 46 and the drive frame 80 when the semi-circular frame 46 is adjusted about its pivot 44. To accomplish this objective a downwardly extending flange 86 at the base 46a of the semi-circular frame 46 carries a forwardly extending block 86a on a mounting stud 86b. The block 86a is adapted to extend into a guideway 88 extending upwardly from the central portion of the drive frame 80, the guideway being composed of a pair of parallel confronting walls laterally spaced from each other sufficiently to accommodate the block 86a. The guideway 88 extends upwardly a sufficient distance from the drive frame 80 to permit the drive frame 80 to rise and fall in respect to the semi-circular frame 46, as may be required by the terrain over which the plow is being operated and for the purpose of elevating the drive frame 80 and the moldboard and blade, either for purpose of adjustment or for purpose of transport from one location of operation to another. At the top of the guideway is a flange 90 having an eye therein to which a nose chain may be attached. For the purpose of the claims, the semi-circular frame 46 and the drive frame 80 may be considered together as a moldboard supporting frame.

A plurality of space lugs 92, 92a and 92b extend forwardly from the base 80a of the drive frame for the purpose of mounting the moldboard 57. The conventional moldboard is formed with a plurality of upstanding vertical ribs at the back face thereof, these ribs being apertured and in registration with the lugs 92, etc., so that attaching pins 94, 94a and 94b (Fig. 2) may be employed to mount the moldboard for rocking movement about a horizontal axis.

Figure 4:
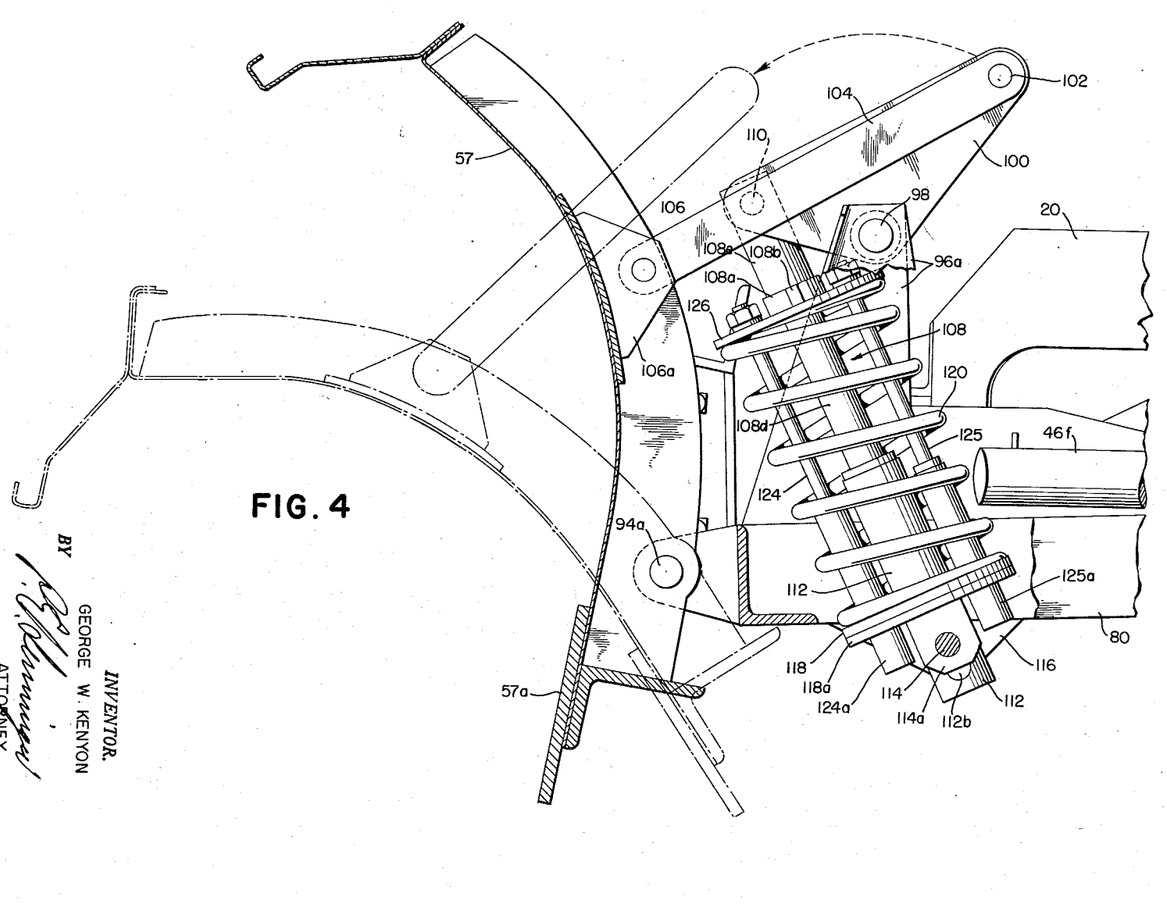
Fig. 4 is an enlarged view of a trip spring and linkage system employed to maintain the blade and moldboard in the full line position, yet being adapted to permit the blade and moldboard to trip into the broken line position upon contact with an obstacle.

It is essential that the moldboard be mounted for rocking movement in order to allow it to trip, and pass over obstacles encountered by the blade in the roadway in which the equipment is being operated. Thus, Figs. 3 and 4 of the drawing show the blade and moldboard in its normal operative position, while the broken line position of Fig. 4 shows the moldboard and blade in a tripped position. A pair of trip levers loaded by relatively heavy trip springs are provided for maintaining the moldboard and blade in the normal operative position such as shown in Fig. 3 and the full lines of Fig. 4. The trip springs are such that when the blade encounters an obstacle in its path, the blade and moldboard will trip to the broken line position of Fig. 4 so that the blade may pass over the obstacle without damage to the blade, but thereafter the spring devices will immediately return the parts to their normal operative position.

Figure 7:
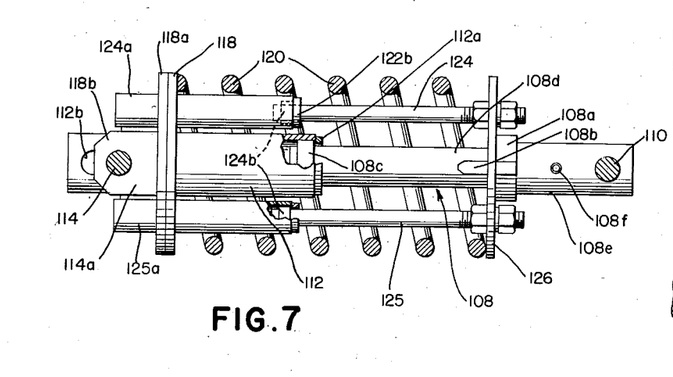
Fig. 7 is a view of a trip spring assembly in which parts are shown partially in section and partially in full line, the assembly being in its normal operative position.

The drive frame 80 has a pair of upstanding ears laterally spaced near each end of the frame. These ears are best shown in Fig. 2 of the drawing wherein the ears 96 and 96a provide means for mounting a trip spring mechanism. The trip spring device at the right of Fig. 2 is shown in greater detail in Figs. 4 and 7, wherein it may be seen that the ears 96a constitute a journal for a shaft 98 to which is fixed a pair of triangular plates 100 which are laterally spaced with respect to each other between thee ars 96a for example. A shaft 102 interconnects one corner of the triangular plates 100 and this shaft provides a mounting for one end of a pair of trip levers 104, the other end of each of which is pivoted on a shaft 106 mounted between a pair of ears 106a extending rearwardly from the moldboard.

The third corner of the triangular plates 100 is attached to a trip spring plunger 108 by means of a transverse pin 110 which is attached between the plates 100 and passes through an eye in the trip spring plunger 108.

The trip spring plunger 108 is constructed in two parts to facilitate assembly of the trip spring mechanism. The plunger 108 consists of a main plunger body 108d and a sleeve 108e which is attached to the upper end of the body 108d by means of a roll pin 108f. The pin 110 further secures the sleeve 108e to the plunger body 108d. The sleeve 108e has a collar 108a formed at the inner end thereof which is adapted to abut a head plate 126, the plunger body 108d being mounted for limited sliding movement in the head plate 126. Extending inwardly from the collar 108a are a pair of diametrically arranged guide pins 108b (only one of which is shown in the drawing) which are accommodated in corresponding apertures in the head plate 126. The guide pins 108b prevent the assembly from twisting, which would result in the binding of the spring bolts 124 and 125 in their respective guide tubes 124a and 125a.

The inner end of the trip spring piston 108 is enlarged by a collar 108c which is adapted to engage a shoulder 112a at the end of a guide cylinder 112 in which the trip spring piston 108 is adapted to reciprocate. The guide piston 112 has secured thereto a spring plate 118, the spring plate 118 being apertured to freely accommodate the guide tubes 124a and 125a. The lower ends of the guide tubes 124a and 125a are fixed to a base plate 118a through which the inner end of the guide cylinder 112 extends.

The spring bolts 124 and 125 are fixed to the head plate 126 and extend into their respective guide tubes 124a and 125a. At the end of each of the spring bolts is a collar, such as that shown at 124b, which is adapted to abut a flange 122b at the upper end of the guide tubes 124a and 125a. The guide cylinder 112 has an elongated slot 112b in opposite walls thereof for accommodating the pin 114. The pin 114 also extends through journal openings in a pair of oppositely disposed ears 114a which extend outwardly from the base plate 118a. Thus it can be seen that the pin 114 serves as an anchor for the base plate assembly, whereas the slot in the guide cylinder 112 through which the pin 114 extends, will permit the guide cylinder 112 and its associated elements to move axially throughout the length of the slot 112b.

The spring bolts 124 and 125 hold the head plate 126 in position when a trip spring 120 located between the spring plate 118 and the head plate 126 is compressed to absorb the shock loading created by the inertia of the moldboard in recovering from a tripped position.

Since the base plate 118a is relatively fixed it may be seen that if the plunger 108 and the head plate 126 are moved toward the spring plate 118 by a force operating on the plunger 108, the trip spring 120 will be compressed such that it will tend to return the plunger 108, when released, to a normal position. In order to impart a good degree of stability to the moldboard and the blade, the trip spring 120 is normally somewhat precompressed thereby avoiding clatter of the blade and moldboard during normal operation.

It may be seen that with the structure hereinabove described, when the blade encounters an obstacle in the roadway over which it is being operated the same will trip forwardly about the pivot pins 94, 94a and 94b. This action will pull the lever 104 forwardly as shown in broken lines in Fig. 4. Forward movement of the lever 104 rocks the triangular plate 100 about its fixed pivot 98. This will result in the depression of the pin 110 and the consequent inward movement of the trip spring piston 108. Since the head plate 126 is depressed by the collar 108a of the trip spring piston 108, the trip spring 120 will be compressed between the downwardly moving head plate 126 and the relatively fixed base plate 118, placing the spring 120 under such further compression sufficient to project the trip spring plunger 108 and return the trip spring levers and consequently the blade and moldboard to their normal position when the blade is free of the obstacle that caused it to trip.

The principle of the invention disclosed herein is applicable to the mounting and control of scraper blades and moldboards having their own specially designed mounting chassis. However, the invention has been disclosed in reference to a snow plow unit which is adapted to be supported from the front of a motor truck of general utility. A truck may be provided, in conventional manner, with a push frame attached to the front end of the truck. In Fig. 1, of the drawing, which is a perspective illustration of the snow plow unit and the means for attaching the same to the front of a motor vehicle, the ears of the supporting A frame 10 are shown pivoted to downwardly extended angle brackets 130 by means of a pair of pivot pins 14a and 16a, for example. The angle brackets 130 comprise part of the push frame which is attached to the truck as shown in Fig. 1. The A frame structure is held in a generally horizontal position by means of the chains 24 and 26 which are attached respectively to the upstanding flanges 20 and 22 of the supporting frame 10. A nose chain 134 is attached to the upstanding flange 90 of the drive frame 80 and this chain has its opposite end attached to a pivoted lift lever 136 the position of which can be controlled by a hydraulic cylinder and piston combination 138 to which the lift elever 136 is attached. The cylinder-piston combination has its opposite end pivoted in a bracket 140, which comprises a horizontal member of the push frame.

Operation of the hydraulic piston-cylinder combination 138 results in the adjustment of the position of the entire snow plow assembly. If the drive frame 80 is elevated, the bottom of the guide slot 88 of the drive frame will engage the guide block 86a thereby lifting the semicircular frame 46 and also the supported A frame 10. It may be seen therefore that provision is made for elevating the snow plow unit either for the general adjustment of its working position or for the purpose of transportation from one site to another.

The term "moldboard" as used in the claims shall be taken to means a moldboard, a scraper blade, or any related combination of blade, moldboard and adjuncts usually fixed thereto.

What I claim is:

1. A moldboard control mechanism for snow plows and the like comprising, a main supporting frame adapted to be attached to the front end of a vehicle, a thrust bar supported by said supporting frame for limited forward and rearward movement in respect thereto, a moldboard supporting frame pivotally connected to said thrust bar and having an arcuate member with latch teeth thereon, a latch member carried by said main supporting frame in the path of said latch teeth for holding said moldboard supporting frame against movement about its pivotal connection with said thrust bar, means acting between said main supporting frame and said thrust bar for normally maintaining said thrust bar in its rearward position and the latch teeth and said latch member engaged, a pivoted lever carried by said main supporting frame for projecting said thrust bar into a forward position against the resistance of said maintaining means to disengage said latch mechanism, power means connected between said pivoted lever and said moldboard supporting frame for changing the angular relation between said moldboard supporting frame and said thrust bar, and a control system for said power means.

2. A moldboard control mechanism for snow plows and the like comprising, a main supporting frame adapted to be attached to the front end of a vehicle, a thrust bar supported by said supporting frame for limited forward and rearward movement in respect thereto, a moldboard supporting frame pivotally connected to said thrust bar and having an arcuate member with latch teeth thereon, a latch member carried by said main supporting frame in the path of said latch teeth for holding said moldboard supporting frame against movement about its pivotal connection with said thrust bar, means acting between said main supporting frame and said thrust bar for normally maintaining said thrust bar in its rearward position and the latch teeth and said latch member engaged, a pivoted lever carried by said main supporting frame for projecting said thrust bar into a forward position against the resistance of said maintaining means to disengage said latch mechanism, a pair of fluid pressure rams having one end thereof attached to said pivoted lever at opposite ends thereof and the other end thereof to said moldboard supporting frame at opposite sides of its pivotal connection to said thrust bar, and a control system for said rams.

3. A moldboard control mechanism for snow plows and the like comprising, a main supporting frame adapted to be attached to the front end of a vehicle, a thrust bar supported by said supporting frame for limited forward and rearward movement in respect thereto, a moldboard supporting frame pivotally connected to said thrust bar and having an arcuate member with latch teeth thereon, a latch member carried by said main supporting frame in the path of said latch teeth for holding said moldboard supporting frame against movement about its pivotal connection with said thrust bar, a spring acting between said main supporting frame and said thrust bar for normally maintaining said thrust bar in its rearward position and the latch teeth and said latch member engaged, a pivoted lever carried by said main supporting frame for projecting said thrust bar into a forward position against the resistance of said spring to disengage said latch mechanism, power means connected between said pivoted lever and said moldboard supporting frame for changing the angular relation between said moldboard supporting frame and said thrust bar, and a control system for said power means.

4. A moldboard control mechanism for snow plows and the like comprising, a main supporting frame adapted to be attached to the front end of a vehicle, a thrust bar supported by said supporting frame for limited forward and rearward movement in respect thereto, a moldboard supporting frame pivotally connected to said thrust bar and having an arcuate member with latch teeth thereon, a latch member carried by said main supporting frame in the path of said latch teeth for holding said moldboard supporting frame against movement about its pivotal connection with said thrust bar, a spring acting between said main supporting frame and said thrust bar for normally maintaining said thrust bar in its rearward position and the latch teeth and said latch member engaged, a pivoted lever carried by said main supporting frame for projecting said thrust bar into a forward position against the resistance of said spring to disengage said latch mechanism, a pair of fluid pressure rams having one end thereof attached to said pivoted lever at opposite ends thereof and the other end thereof to said moldboard supporting frame at opposite sides of its pivotal connection to said thrust bar, and a control system for said rams.

5. A moldboard control mechanism for snow plows and the like comprising, a main supporting frame, a thrust bar supported by said supporting frame for limited forward and rearward movement in respect thereto, a moldboard supporting frame pivotally connected to said thrust bar and having an arcuate member with latch teeth thereon, a latch member carried by said main supporting frame in the path of said latch teeth for holding said moldboaord supporting frame against movement about its pivotal connection with said thrust bar, means acting between said main supporting frame and said thrust bar for normally maintaining said thrust bar in its rearward position and the latch teeth and said latch member engaged, a pivoted lever carried by said main supporting frame for projecting said thrust bar into forward position against the resistance of said maintaining means to disengage said latch mechanism, and power means for operating said pivoted lever to project said thrust bar.

6. A moolddboard mechanism for snow plows and the like, comprising a main supporting frame adapted to be attached to the front end of a vehicle, a moldboard supporting frame mounted for limited forward and rearward movement in respect to said main supporting frame, a moldboard carried by said moldboard supporting frame, a substantially vertical pivot pin for said moldboard supporting frame about which said frame may be rotated to adjust the angular position of said moldboard, a latch element carried by said moldboard supporting frame, a latch element carried by said main supporting frame, yielding means acting between said main supporting frame and said moldboard supporting frame for normally maintaining said moldboard supporting frame in its rearward position and said latch elements engaged with each other to hold said moldboard supporting frame against rotation, and single power means for projecting said moldboard supporting frame and said moldboard together to a forward position against the resistance of said yielding maintaining means to disengage said latch elements and rotate said moldboard supporting frame about said pivot pin.

7. A moldboard mechanism in accordance with claim 6 in which said power means is an hydraulic ram.

References Cited in the file of this patent

UNITED STATES PATENTS

| | | |
|---|---|---|
| 1,844,058 | Dean | Feb. 9, 1932 |
| 2,094,515 | Abbe | Sept. 28, 1937 |
| 2,166,424 | Coates | July 18, 1939 |
| 2,251,452 | Hirst | Aug. 5, 1941 |
| 2,440,905 | Maxim | May 4, 1948 |